(12) United States Patent
Veltman et al.

(10) Patent No.: US 12,045,371 B2
(45) Date of Patent: Jul. 23, 2024

(54) CONSENT-DRIVEN PRIVACY DISCLOSURE CONTROL PROCESSING

(71) Applicant: NCR Voyix Corporation, Atlanta, GA (US)

(72) Inventors: Nir Veltman, Johns Creek, GA (US); Jason Patterson, Tarzana, CA (US); Mikhail Romanovich Shapirov, Alpharetta, GA (US); Nilesh Sharma, Cumming, GA (US); Joseph Arnold White, Encinitas, CA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 18/125,463

(22) Filed: Mar. 23, 2023

(65) Prior Publication Data

US 2023/0229804 A1 Jul. 20, 2023

Related U.S. Application Data

(63) Continuation of application No. 17/458,837, filed on Aug. 27, 2021, now Pat. No. 11,681,824, which is a continuation of application No. 15/993,479, filed on May 30, 2018, now Pat. No. 11,182,498.

(51) Int. Cl.
*G06F 21/62* (2013.01)
*H04L 9/32* (2006.01)

(52) U.S. Cl.
CPC ........ *G06F 21/6245* (2013.01); *H04L 9/3247* (2013.01); *G06F 2221/2141* (2013.01)

(58) Field of Classification Search
CPC ......... G06F 21/6245; G06F 2221/2141; H04L 9/3247; H04L 9/3213
See application file for complete search history.

(56) References Cited

PUBLICATIONS

Villarreal et al. (2017); Privacy Token: A Mechanism for User's Privacy Specification in Identity Management Systems for the Cloud; ICN 2017: The 16th International Conference on Networks (Includes Softnetworking 2017), Apr. 23-27, 2017; Venice, Italy; pp. 53-58. (Year: 2017).*

* cited by examiner

*Primary Examiner* — Brian F Shaw
(74) *Attorney, Agent, or Firm* — Schwegman Lundberg & Woessner, P.A.

(57) ABSTRACT

A user provides retailer-specific consents for access and use to private/sensitive information of the user. The private/sensitive information is centrally stored in a privacy vault. Retail services (retailer) that the user subscribes to are provided a user-specific and consent-specific token representing the user and consents to usage of specific private/sensitive information of the user. When the retailer has a need for user-specific private/sensitive information, the retailer presents the user-specific and consent-specific token to the privacy vault. Assuming, the retailer was given access to the requested private/sensitive information defined in the token, the privacy results returns the requested information to the retailer; otherwise, an unauthorized message is returned from the privacy vault to the retailer. The user defines the consents to each retailer and a record of the consents is maintained in the privacy vault.

20 Claims, 4 Drawing Sheets

CONSENT-DRIVEN PRIVACY DISCLOSURE CONTROL PROCESSING

CROSS-REFERENCE TO RELATED APPLICATION

This application is a continuation of U.S. patent application Ser. No. 17/458,837, filed Aug. 27, 2021, which is a continuation of U.S. patent application Ser. No. 15/993,479, filed May 30, 2018, now U.S. Pat. No. 11,182,498, which applications and publications are incorporated herein by reference in their entirety.

BACKGROUND

Before promulgation of the General Data Protection Regulation (GDPR) compliance by the European Union (EU), individuals did not have to provide consent for their private/sensitive information to be shared within the industry. With this new requirement, it is difficult to manage private/sensitive information across services/products that need access to that information. Furthermore, when an individual requests for his/her information to be deleted, all his/her records must be made inaccessible to other systems. The approach that companies have been taking is spending large sums of money to map/classify an individual's information, so that individual requests can be in compliance with GDPR.

Furthermore, individuals' private/sensitive information floats through many systems (some of which the individuals may be completely unaware of). As a result, companies are often facing what seems to be an insurmountable problem. Recent events in the United States (in particular the Facebook® congressional hearings) make clear that even stricter standards may be coming to the industry. The public is becoming more and more interested in ensuring that private/sensitive information is tightly controlled.

SUMMARY

In various embodiments, methods and a system for consent-driven privacy disclosure control processing are presented.

According to an embodiment, a method for consent-driven privacy disclosure control processing is presented. Specifically, and in an embodiment, a token is received from a requesting service for access to a portion of a private/sensitive information. Next, the requesting service is provided the portion when the token identifies a registered user and a consent indicating that the registered user has recorded consent to allow the requesting service to access the portion.

DETAILED DESCRIPTION

Figure 1:
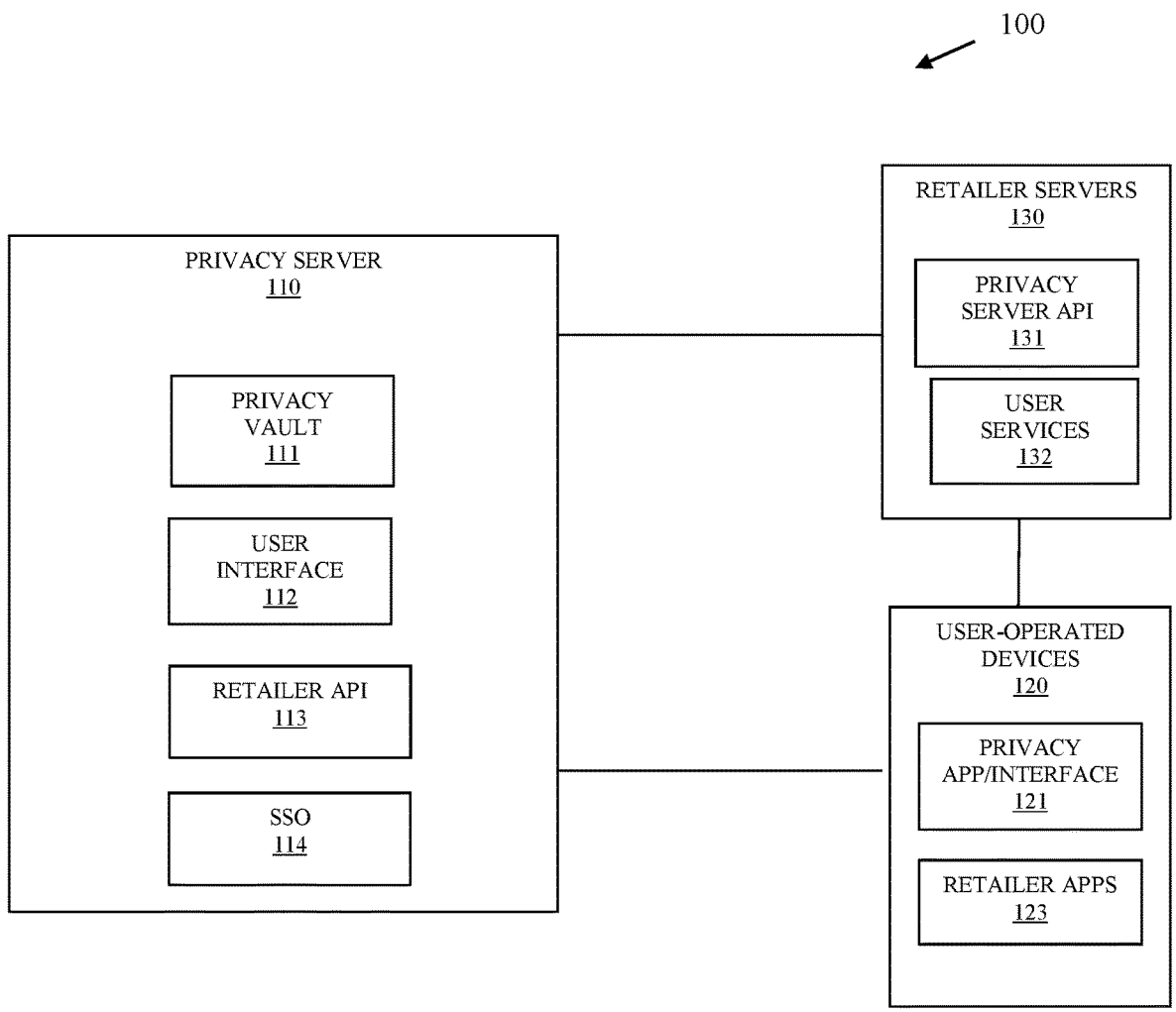
FIG. 1 is a diagram of a system for consent-driven privacy disclosure control processing, according to an example embodiment.

FIG. 1 is a diagram of a system 100 $f$ for consent-driven privacy disclosure control processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of consent-driven privacy disclosure control processing, presented herein and below.

The system 100 includes a privacy server 110. The privacy server 110 includes: a privacy vault 111, a user interface 112, a retailer Application Programming Interface (API) 113, and a single sign-on service (SSO) 114.

The system 100 also includes user-operated devices 120. The user-operated devices 120 including a privacy application (app)/interface 121 and retailer apps 123.

The system 100 further includes retailer servers 130. The retailer servers 130 include a privacy server API 131 and a variety of user-services 132.

The system 100 can be operated in a variety of manners as described herein and below.

When a user registers for a user service 132 of a retailer, the user service 132 presents a registration interface within the retailer app 123 on the user-operated device 120 (note that this can also be web-based such that the registration interface is accessible through a browser so no specific retailer app 123 may be necessary). The user provides required information, such as name, address, email, and password. The privacy server API 131 utilizing the retailer API 113 redirects the registration interface to the user interface 112 of the privacy server 110. The user is then asked to provide legal consent to disclosure of private/sensitive information and is presented with a list of selectable consents with scope, such as agree to allow the retailer to send emails to the user, allow the retailer to make phone calls to the user, allow the retailer to make text messages to the user, allow the retailer to send postage mail to the user, and the like.

The user interface 112 then obtains, from the user, the private/sensitive information that the user consented to (email, phone number, address, name, age, gender, etc.), stores the legal consent provided by the user, and records the user's private/sensitive information along with the consents in the privacy vault 111. A token is generated that uniquely represents the user and provided back to retailer server 130 through the privacy API 131. The retailer server 130 completes registration of the user and records the user privacy token with the user record.

In another case, the user directly utilizes the privacy app/interface 120 (can be a mobile app or a web-based browser interface) on the user-operated device 120 and access the user interface 112 for registering with the privacy server 110. Again, the user is presented with a registration page and consents for sharing specific private/sensitive information (which the user supplies for that which is being shared). The legal consents and the sharable private/sensitive information is stored in the privacy vault 111 and the user is returned a token that uniquely represents the user and is usable by the privacy server 110 to identify the user's private/sensitive information and corresponding consents.

If the user initially provided consents through a specific user service 132 of a specific retailer, then when the user initially registers with that service 132, the registration page may identify the privacy server 110 and ask if the user has a current registration and wants to sign in through the SSO 114. In this embodiment, if the user successfully logs on, the user may be presented with the previous consents and asked if the user wants any further changes to the current registered consents for this particular retailer. The user may also be able to bypass providing basic information to the retailer, such as address, phone number, etc., since the retailer API 113 can provide this directly to the appropriate retailer through the privacy server API 131 based on this being provided by the user during the previous registration with the privacy server 110. If the user changes consents for this particular retailer, then the privacy server 110 provides that retailer a modified user token representing that retailer's specific agreed to consents provided by the user to the user's private/sensitive information. So, the user is in control and can custom provided different levels of consent based on the specific user services 132.

In an embodiment, the user services' registration or login is modified, such that when a user attempts to register to a particular user service 132, the user is asked if he wants to sign-on through the privacy server 110. If the user agrees and has registered with the privacy server 110, the user is redirected to the login screen of the privacy server 110, once logged on the retailer API 113 notifies the privacy server API 131 and normal registration continues between the user and user service 132 of the retailer, which will entail a call back to the privacy server 110 for the user to provide consents to the retailer associated with the user service 132. In this embodiment, the user does not have to provide a user identifier or password to the user service 132, since the user is able to logon to the user service 132 through a successful logon to the privacy server 110 and the return of the retailer specific user token (specific because it identifies the consents for that retailer), the retailer specific user token can serve as the user identifier and credential in the user record at the retailer.

When a retailer 130 wants to interact or use the user's private or sensitive information, for purposes of sending a promotion, sending a notification to a phone or email about an order, and other purposes. The privacy server API 131 is used to send a request with the retailer-held user token of the user. The request identifies what private/sensitive information that the retailer is requesting, such as email, phone number, etc. The retailer API 113 receives the request and uses the user token to identify the user, then inspects what specific private/sensitive information that the retailer is requesting and searches the privacy vault 111. If the retailer has the proper consent from the user on file (as noted in the privacy vault 111) for the requested private/sensitive information, then the privacy vault returns the requested private/sensitive information and the retailer API 113 provides to the privacy server API 131 of the retailer server 130. The retailer can then use the privacy/sensitive information to send an email, send a text message, make a call, or whatever the case may be that the user needed the privacy/sensitive information for.

When a retailer requests private/sensitive information for which the presented user token does not authorize, no information is returned and a message of "unauthorized is sent from the retailer API 113 to the corresponding privacy server API 131.

Each retailer is provided a specific user token that is specific to the user and specific to the retailer (based on each retailer's roles). Each user token includes an indication as to the consents that have been recorded and stored by the user for that particular retailer. The consent may be viewed as the retailers' security roles for accessing the privacy vault 111 of a particular user and based on the user tokens possessed by the retailers with the roles mapping to the consents available for those retailers. A user may have different personas with each retailer that maps to a single specific identity for the user in the privacy vault 111.

In an embodiment, the user tokens are encrypted. In an embodiment, each user token is encrypted with keys specific to each retailer server 130 and specific to the privacy server 110.

In an embodiment, the user tokens are digitally signed by both the privacy server 110 and the retailer servers 130.

In an embodiment, the user-operated device is one of: a phone, a laptop, a desktop, a tablet, a wearable processing device, a Self-Service Terminal (SST), an Automated Teller Machine (ATM), a kiosk, a Point-Of-Sale (POS) terminal, and an Internet-of-Things (IoT) device.

In an embodiment, the privacy server 110 is a collection of servers organized as a cloud environment.

In an embodiment, the user-interface 112, the retailer API 113, and the SSO 114 of the privacy server 110 is provided as a Software-as-a-Service (SaaS).

The system 100 provides a centralized privacy vault 111 that is centrally controlled, such that should a user request removal of private/sensitive information; the deletion can occur in one location and each of the retailers are assured to be on compliance with government regulations and the users are assured that the private/sensitive information is removed from the Internet.

The system 100 also provides a technique that is integrated into the retailers' services and provides a mechanism for ensuring and proving GDPR compliance. Furthermore, should regulations change and they will change, the retailers do not need to concern themselves with such changes as they can be handled in the privacy server 110.

These and other embodiments are now discussed with reference to the FIGS. 2-4.

Figure 2:
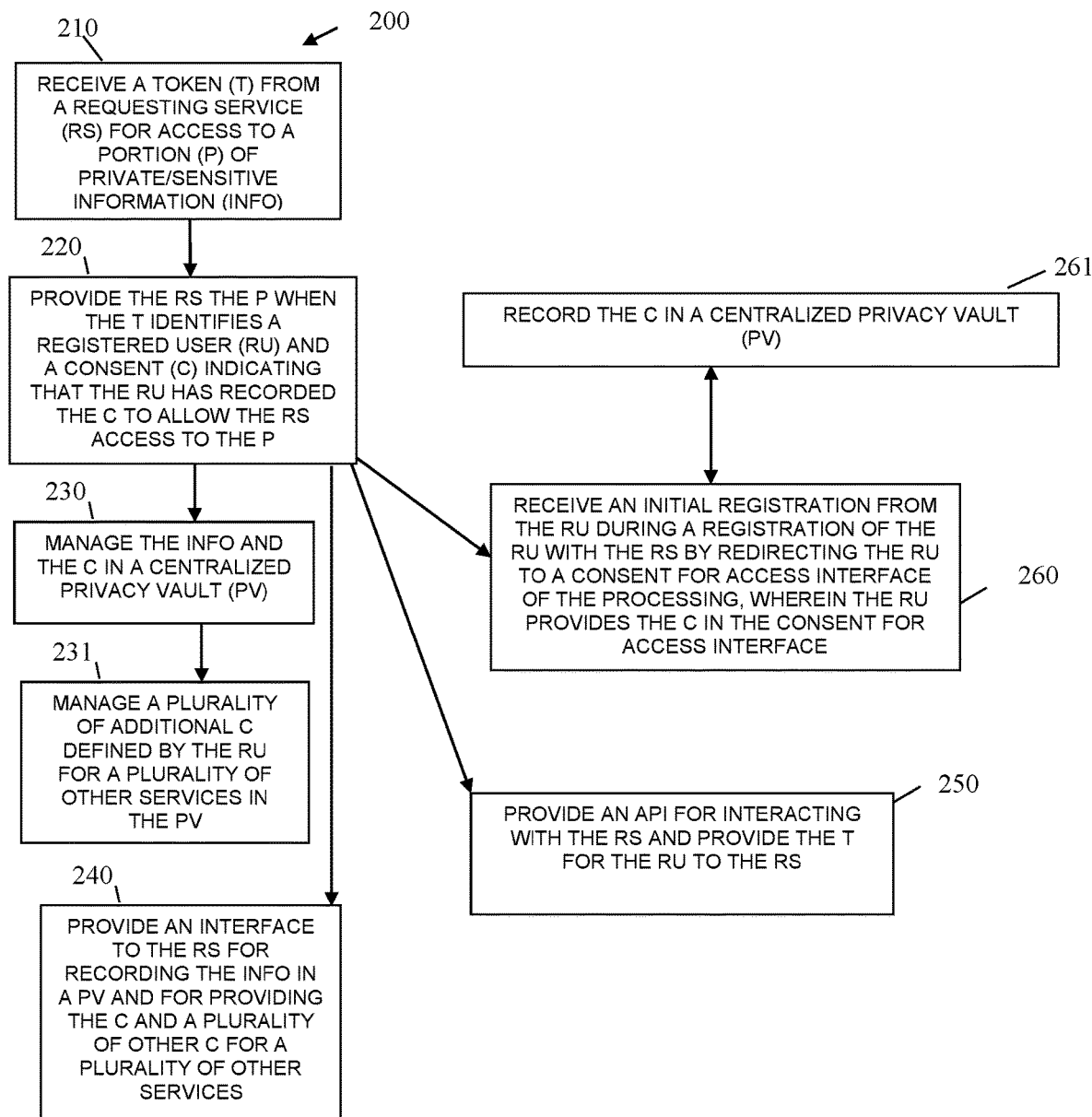
FIG. 2 is a diagram of a method for consent-driven privacy disclosure control processing, according to an example embodiment.

FIG. 2 is a diagram of a method 200 for consent-driven privacy disclosure control processing, according to an example embodiment. The software module(s) that implements the method 200 is referred to as a "private/sensitive information controller." The private/sensitive information controller is implemented as executable instructions programmed and residing within memory and/or a non-transitory computer-readable (processor-readable) storage medium and executed by one or more processors of a device. The processor(s) of the device that executes the private/sensitive information controller are specifically configured and programmed to process the private/sensitive information controller. The private/sensitive information controller may or may not have access to one or more network connections during its processing. The network connections can be wired, wireless, or a combination of wired and wireless.

In an embodiment, the device that executes the private/sensitive information controller is the server 110.

In an embodiment, the device that executes the private/sensitive information controller a logical collection of servers organized as a cloud.

In an embodiment, the private/sensitive information controller is the user interface 112, the retailer API 113, and the SSO 114.

The private/sensitive information controller has access and exclusive control over a privacy vault. In an embodiment, the privacy vault is the privacy vault 111.

At 210, the private/sensitive information controller receives a token from a requesting service for access to portion of private/sensitive information (info).

At 220, the private/sensitive information controller provides the requesting service the portion of the info when the token identifies the registered user and a consent that indicates that the registered user has recorded the consent to allow the requesting service access to the portion of information.

In an embodiment, the requesting service originates from a retailer server 130 and uses the privacy server API 131 to interact with the private/sensitive information controller through the retailer API 113.

In an embodiment, at 230, the private/sensitive information controller manages the info and the consent in a centralized privacy vault. In an embodiment, the centralized privacy vault is the privacy vault 111.

In an embodiment of 230 and at 240, the private/sensitive information controller manages a plurality of additional registered user's consents defined by the registered user for a plurality of other registered services through the centralized privacy vault.

In an embodiment, at 240, the private/sensitive information controller provides an interface to the requesting service for recording the info in a centralized privacy vault and a plurality of other consents for a plurality of other services.

In an embodiment, at 250, the private/sensitive information controller provides an API for interacting with the requesting service and provides the token for the registered user to the requesting services. In an embodiment, the API is the privacy server API 131 and the retailer API 113.

In an embodiment, at 260, the private/sensitive information controller receives an initial registration from the registered user during a registration of the registered user with the requesting service by redirecting the registered user to a consent for access interface of the private/sensitive information controller. The registered user provides the consent in the consent for access interface. In an embodiment, the consent for access interface is the user interface 112 and/or the SSO 114.

Figure 3:
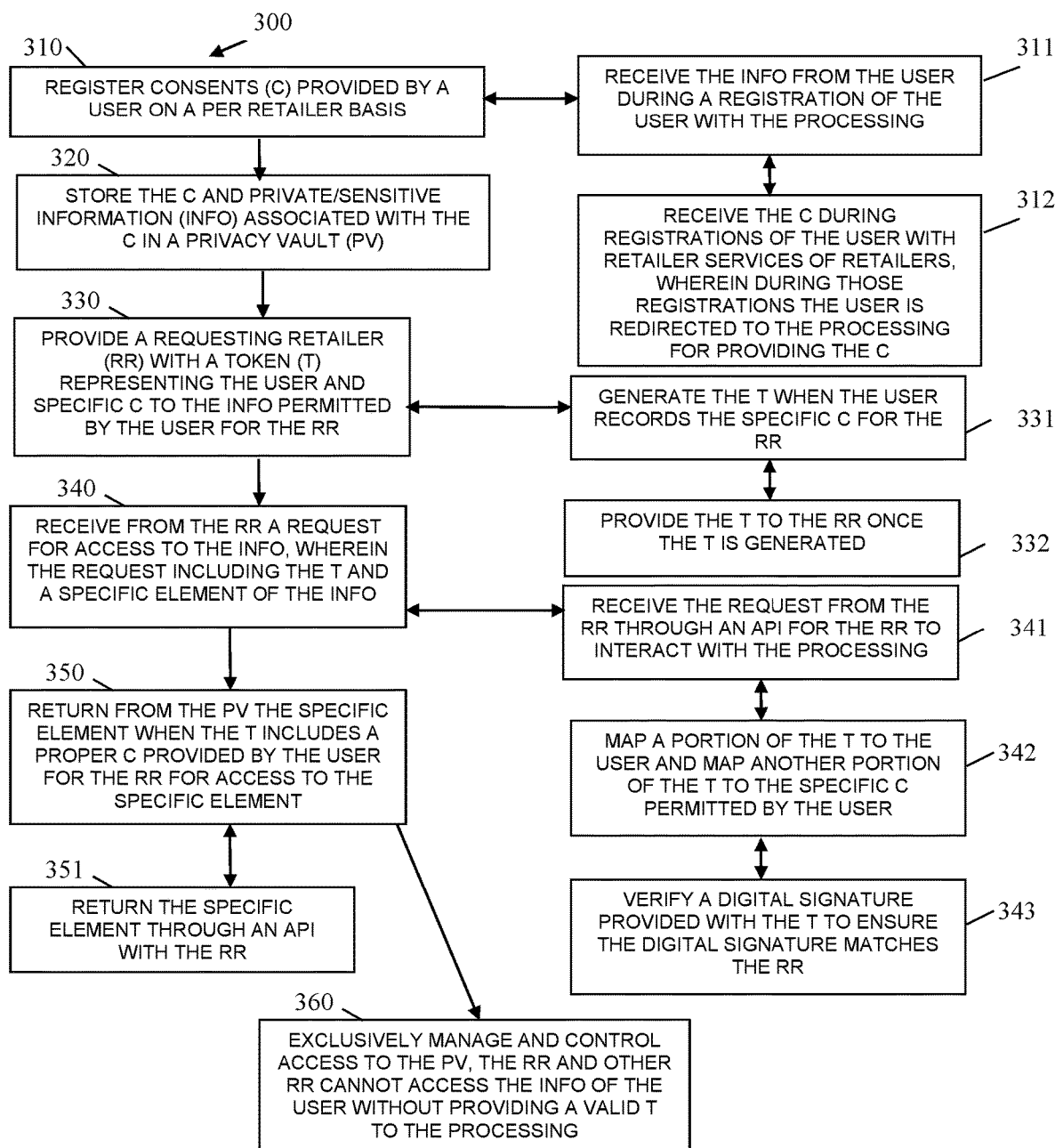
FIG. 3 is a diagram of another method for consent-driven privacy disclosure control processing, according to an example embodiment.

FIG. 3 is a diagram of another method 300 for consent-driven privacy disclosure control processing, according to an example embodiment. The software module(s) that implements the method 300 is referred to as an "information consent gatekeeper." The information consent gatekeeper is implemented as executable instructions programmed and residing within memory and/or a non-transitory computer-readable (processor-readable) storage medium and executed by one or more processors of a device. The processors that execute the information consent gatekeeper are specifically configured and programmed to process the information consent gatekeeper. The information consent gatekeeper may or may not have access to one or more network connections during its processing. The network connections can be wired, wireless, or a combination of wired and wireless.

In an embodiment, the device that executes the information consent gatekeeper is the privacy server 110.

In an embodiment, the device that executes the information consent gatekeeper is a logical collection of servers organized as a cloud.

In an embodiment, the information consent gatekeeper is the user interface 112, the retailer API 112, and the SSO 114.

The information consent gatekeeper has exclusive control over and access to a privacy vault. In an embodiment, the privacy vault is the privacy vault 111.

The information consent gatekeeper presents another and in some ways enhanced processing perspective of the method 200.

At 310, the information consent gatekeeper registers consents provided by a user on a per retailer basis.

In an embodiment, at 311, the information consent gatekeeper receives private/sensitive information (info) from the user during a registration of the user with the information consent gatekeeper.

In an embodiment of 311 and at 312, the information consent gatekeeper receives the consents during registrations of the user with retailer services of retailers, wherein during those registrations the user is redirected to the information consent gatekeeper for providing the consents. This was discussed above in connection with the SSO 114 and the user services 132 of the retailer servers 130.

At 320, the information consent gatekeeper stores the consents and the info associated with the consents in a privacy vault. In an embodiment, the privacy vault is the privacy vault 111.

At 330, the information consent gatekeeper provides a requesting retailer with a token representing the user and specific consents to the info permitted by the user for the requesting retailer.

In an embodiment, at 331, the information consent gatekeeper generates the token when the user records the specific consents for the requesting retailer.

In an embodiment of 331 and at 332, the information consent gatekeeper provides the token to the requesting retailer once the token is generated by the information consent gatekeeper.

At 340, the information consent gatekeeper receives from the requesting retailer a request for access to the info. The requesting including the token and a specific element of the info.

In an embodiment, at 341, the information consent gatekeeper receives the request from the requesting retailer through an API for the requesting resource to interact with the information consent gatekeeper. In an embodiment, the requesting retailer uses the privacy server API 131 and interacts with the retailer API 113 of the information consent gatekeeper.

In an embodiment of 341 and at 342, the information consent gatekeeper maps a portion of the token to the user and maps another portion of the token to the specific consents permitted by the user for the requesting retailer.

In an embodiment of 342 and at 343, the information consent gatekeeper verifies a digital signature provided with the token to ensure the digital signature matches the requesting retailer.

At 350, the information consent gatekeeper returns from the privacy vault the specific element when the token includes a proper consent provided by the user for the requesting retailer for access to the specific element.

In an embodiment, at 351, the information consent gatekeeper returns the specific element through an API with the requesting retailer. In an embodiment, the API is the retailer API 113.

According to an embodiment, at 360, the information consent gatekeeper exclusively manages and controls access to the privacy vault. The requesting retailer and other requesting retailers cannot access the info of the user without providing a valid token to the information consent gatekeeper. A valid token identifies the user, the requesting retailer, and user-provided consent for accessing specific elements of the info within the privacy vault.

Figure 4:
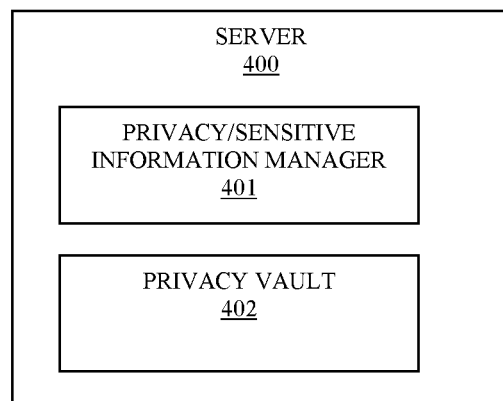
FIG. 4 is a diagram of another system for consent-driven privacy disclosure control processing, according to an example embodiment.

FIG. 4 is a diagram of a server 400 for consent-driven privacy disclosure control processing, according to an example embodiment. The server 400 includes a variety of hardware components and software components. The software components of the server 400 are programmed and reside within memory and/or a non-transitory computer-readable medium and execute on one or more processors of the server 400. The server 400 communicates over one or more networks, which can be wired, wireless, or a combination of wired and wireless.

In an embodiment, the server 400 implements, inter alia, the processing described above with the FIGS. 1-3.

The server 400 includes a privacy/sensitive information manager 401 and a privacy vault 402.

In an embodiment, the server 400 is the privacy server 110.

In an embodiment, the server 400 is a logical collection of servers cooperating as a cloud.

In an embodiment, the privacy vault 402 is the privacy vault 111.

In an embodiment, the privacy/sensitive information manager 401 is all or some combination of: the user interface 112, the retailer API 113, the SSO 114, the method 200, and/or the method 300.

The privacy/sensitive information manager 401 is configured to: (i) record private/sensitive information of a user in a privacy vault exclusively managed by the privacy server, (ii) record consents provided by the user for selective access to portions of the private/sensitive information on a per retailer bases, (iii) provide a user-consent token that is specific to each of the retailers, (iv) verify presented user-consent tokens from requesting ones of the retailers, and (v) provide specific elements of the private/sensitive information to any of the retailers that provide a valid user-consent token.

In an embodiment, the privacy/sensitive information manager 401 is further configured in, (iii), to: generate the user-consent token for each retailer based on specific consents provided by the user for each retailer.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
obtaining private information of a user from the user;
storing the private information in a secure privacy vault;
generating a token defining user consents to disclosure of types of the private information, wherein the token is unique to the user and a retailer;
linking the token to the private information; and
providing the token to at least one of the retailer and the user.

2. The method of claim 1 further comprising:
receiving a candidate token from the retailer in a request for retailer designated types of the private information for the user;
matching the candidate token to the token in the secure privacy vault;
determining whether the consents in the token correspond with the retailer designated types of the private information; and
returning the retailer designated types of the private information from the secure privacy vault to the retailer when the consents defined in the token correspond with the retailer designated types of the private information.

3. The method of claim 1 further comprising:
receiving a candidate token from the retailer in a request for retailer designated types of the private information for the user;
matching the candidate token to the token in the secure privacy vault;
determining that at least one of the retailer designated types of private information lacks a corresponding consent defined in the token;
returning authorized retailer designated types of the private information from the secure privacy vault to the retailer that correspond to the consents defined in the token; and
returning an unauthorized message to the retailer for the at least one retailed designated types of private information that lacked the corresponding consent defined in the token.

4. The method of claim 1 further comprising, iterating to the storing for additional retailers during registrations sessions of the users with the additional retailers.

5. The method of claim 1 further comprising, iterating to the storing for additional retailers designated by the user during a registration session with the user.

6. The method of claim 1 further comprising:
receiving a request from the user to modify the consents for the retailer;
generating modified consents provided by the user;
updating the token as an updated token based on the modified consents;
removing the token from the private information of the user within the secure privacy vault; and
storing the updated token with the private information of the user within the secure privacy vault.

7. The method of claim 1, wherein obtaining further includes receiving the private information from the user during a registration session with the retailer during which a registration interface of the retailer redirects the user to a user interface of the method for purposes of obtaining the private information from the user independently and separately from the registration interface of the retailer.

8. The method of claim 7 further comprising: identifying the user being redirected from a second registration interface to the user interface during a second registration session of the user with a second retailer; and iterating to the generating for second consents provided by the user through the user interface for the second retailer and generated a second token defining the second consents, wherein the second token unique to a combination of the user and the second retailer; linking the second token to the private information; and providing the second token to one or more of the second retailer and the user.

9. The method of claim 1, wherein generating further include encrypting the token with a key unique to the user and with a key unique to the retailer.

10. The method of claim 9, wherein generating further includes digitally signing the token with a digital signature associated with the method and the retailer.

11. The method of claim 1, wherein generating further includes identifying at least one consent as an authorization by the user to permit single sign on (SSO) between the method and a service of the retailer and notifying the retailer of the consent causing a retailer service interface to redirect the user during a subsequent sign on by the user with the service to a sign on of a user interface associated with the method, wherein the retailer service interface subsequently accepts credentials of the user provided by the user to sign on through the user interface as a sign on to the service based on a notification provided by the user interface sent back to the retailer service interface when the user successfully signs on through the user interface, wherein during a subsequent SSO once the user authenticates through the user interface, the user interface redirects the user to the retailer service interface for an authenticated session with the service.

12. A method, comprising:
receiving consents for each of a plurality of retailers for access to user-designated types of private information of the user during a registration session with the user;
generating a token for each retailer defining the corresponding consents to the corresponding types of information based on the receiving, each token is unique to the user and a specific retailer;
linking the tokens to the private information of the user; and
providing the tokens to the user to share with the corresponding retailers.

13. The method of claim 12 further comprising:
receiving a redirected registration request associated with the user from a retail service of a certain retailer, wherein the redirected registration request includes a candidate token;
matching the certain retailer to a certain token based on a retailer service identifier for the retailer and the candidate token; and
returning the corresponding types of private information defined by the certain token back to the retailer service for completion of a second registration session of the user with the retail service.

14. The method of claim 12 further comprising:
receiving modifications from the user to certain consents associated with a certain token and a certain retailer;
updating the certain consents defined in the certain token in an updated certain token;
linking the updated certain token to the private information of the user; and
providing the updated certain token to the user.

15. The method of claim 12 further comprising:
receiving a deletion request from the user to a certain token associated with a certain retailer; and
removing a link between the certain token and the private information of the user.

16. The method of claim 12, wherein receiving further includes obtaining the private information from the user during the registration session and storing the private information in a secure privacy vault linked to an account of the user with the method.

17. The method of claim 12, wherein generating further includes encrypting each token with a unique key of the user and a unique key of the corresponding retailer.

18. The method of claim 12, wherein receiving further includes rendering a consent interface on a user device for receiving the consents, selections that identify the retailers, and the private information from the user during the registration session.

19. A system, comprising:
a secure privacy vault;
a server comprising a processor and memory;
the memory comprising instructions which when executed by the processor cause the processor to perform operations, comprising:
storing private information received from a user in the secure privacy vault;
generating a token for each user-designated retailer defining consents for a corresponding retailer to access to types of the private information of the user, each token unique to a combination of the user and the corresponding retailer;
linking the tokens to the private information in the secure privacy vault;
providing each token to one or more of the user and the retailer associated with the corresponding token; and
controlling access to the types of the private information released from the secure privacy vault based on presentation of a given token, an identifier of a given retailer, and a user identifier for the user.

20. The system of claim 19, wherein the instructions which when executed by the processor further cause the processor to perform additional operations, comprising:
integrating the controlling into registration interfaces associated with the retailers through redirection of the registration interfaces to the controlling when the registrations interfaces are requesting certain types of the private information for registrations of the user with retail services of the retailers.

* * * * *